Figure 1:
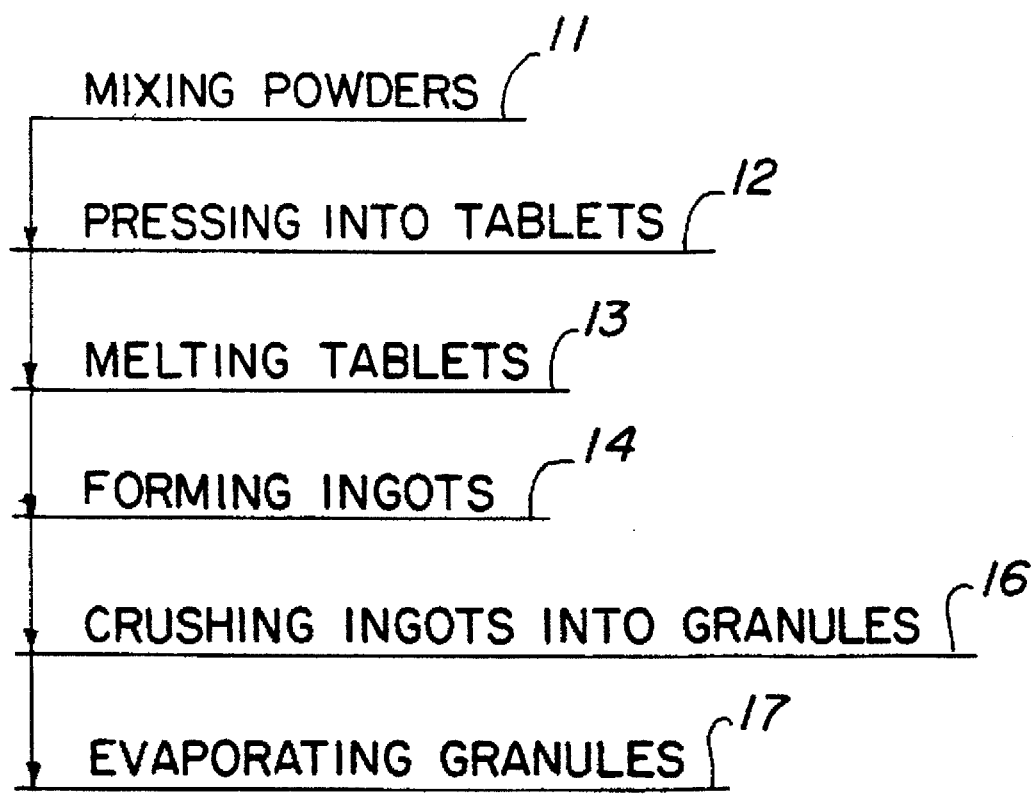

United States Patent [19]

Coombs et al.

[11] Patent Number: 5,641,719
[45] Date of Patent: Jun. 24, 1997

[54] MIXED OXIDE HIGH INDEX OPTICAL COATING MATERIAL AND METHOD

[75] Inventors: Paul G. Coombs; Russell E. DeLong, both of Santa Rosa; Charlotte R. LeGallee, Healdsburg, all of Calif.

[73] Assignee: Flex Products, Inc., Santa Rosa, Calif.

[21] Appl. No.: 438,198

[22] Filed: May 9, 1995

[51] Int. Cl.$^6$ .................................. C04B 35/462
[52] U.S. Cl. .................. 501/134; 501/103; 501/152
[58] Field of Search .................. 501/103, 134, 501/152

[56] References Cited

U.S. PATENT DOCUMENTS

| | | | |
|---|---|---|---|
| 2,653,107 | 9/1953 | Blumenthal | 501/103 |
| 3,034,925 | 5/1962 | Kraus et al. | |
| 3,049,432 | 8/1962 | Weber | 501/103 |
| 3,264,694 | 8/1966 | Weber | 501/103 |
| 3,948,813 | 4/1976 | Holcombe, Jr. et al. | 501/103 |
| 5,021,386 | 6/1991 | Muan et al. | 502/248 |
| 5,049,355 | 9/1991 | Gennari et al. | |
| 5,106,794 | 4/1992 | Oizumi et al. | 501/103 |
| 5,225,382 | 7/1993 | Mizuno et al. | 501/134 |
| 5,340,607 | 8/1994 | Friz et al. | 501/134 |

FOREIGN PATENT DOCUMENTS

| | | |
|---|---|---|
| 4208811 | 9/1993 | Germany. |
| 0095204 | 7/1980 | Japan. |

Primary Examiner—Mark L. Bell
Assistant Examiner—David Sample
Attorney, Agent, or Firm—Flehr Hohbach Test Albritton & Herbert LLP

[57] ABSTRACT

A composition of material of the formula $MN_xO_y$, where M and N are metals selected from groups IIIA, IVA and VA of the periodic table, O is oxygen and x and y have values such that the oxygen-to-metal ratio is less than 4 and the ratio of $y/(1+x)$ is also less than 4, said material being in the form of a single oxide phase and having a crystal structure of a single type alone with no detectable crystal structure of a second type, said material being sub-stoichiometric.

3 Claims, 1 Drawing Sheet

MIXING POWDERS — 11

PRESSING INTO TABLETS — 12

MELTING TABLETS — 13

FORMING INGOTS — 14

CRUSHING INGOTS INTO GRANULES — 16

EVAPORATING GRANULES — 17

MIXED OXIDE HIGH INDEX OPTICAL COATING MATERIAL AND METHOD

This invention relates to a mixed oxide high refractive index coating material and method.

U.S. Pat. No. 3,034,924 discloses mixtures of lanthanide and transition metal/metal oxides. Zirconium oxide is a commercially available high index coating material. However, it has a number of disadvantages including high melting temperature, high power requirements and inhomogeneities in coatings made therefrom. At the same time, titanium oxides are also used as high index coating materials. Titanium oxide coatings often possess unwanted absorption. Mixtures of zirconium oxide and titanium oxide powders are also commercially available. The mixtures are multi-phase materials, however, and hence do not yield a congruently evaporating source. There is therefore a need for new and improved mixed oxide high index optical coating materials which overcomes these disadvantages.

In general, it is an object of the present invention to provide a mixed oxide high index coating material which is particularly suitable for use in anti-reflection coatings.

Another object of the invention is to provide a material and method of the above character which can be melted at lower temperatures.

Another object of the invention is to provide a material and method of the above character which lends itself to electron beam evaporation.

Another object of the invention is to provide a material and method of the above character which can be reactively evaporated with oxygen to yield a stoichiometric material.

Another object of the invention is to provide a material and method of the above character which provides hard and adherent films.

Additional objects and features of the invention will appear from the following description in conjunction with the accompanying drawing.

FIG. 1 is a flow chart showing the method of the present invention.

In the general case of the present invention, the composition of the material has the formula $MN_xO_y$, where M the IVPAC periodic table where O is oxygen and x and y are chosen such that the oxygen-to-metal ratio is less than 4 and the ratio of $y/(1+x)$ is also less than 4. More specifically, the M and N metals are selected from a group consisting of Sc, Y, La, Ac, Ti, Zr, Hf, V, Nb and Ta. The composition of materials which fall into this category include the following examples: $YTi_xO_y$, $HfTi_xO_y$, and $ZrNb_xO_y$. Thus it can be seen that the composition of the material is comprised of two metal/metal oxides. However, the composition of the material could just as easily be comprised of three or more metal/metal oxides.

One specific composition of a material which is within the general case described above is $ZrTi_xO_y$, where x is typically 1.0, and y varies from 2.0 to 3.9. It is also possible to formulate other materials with y values between a value greater than 0 and 2.0. However, these materials would be metallic in nature and would be very difficult to utilize to produce thin films of $ZrTiO_4$ using reactive evaporation. As the value of x increases above 1.0, the mixture becomes more titania-rich and the phase diagram becomes more complicated. This is especially true when the material is sub-stoichiometric. As the value of x drops below 1.0, the material begins to take on properties of pure zirconia and the melting temperatures increases, eliminating one of the distinct advantages of the material of the present invention.

In one embodiment of the present invention, a homogeneous mixture was prepared of 15.6% Ti, 17.4% $TiO_2$, and 67.0% $ZrO_2$ by weight. The powdered materials were thoroughly mixed as shown in Step 11 of FIG. 1. As explained above, the weight percentages of the three components were chosen to give the molecular formula $ZrTiO_{2.8}$. However, the proportions of Ti, $TiO_2$, and $ZrO_2$ could have been varied so as to give the molecular formula $ZrTiO_y$, where y could range from 2.0 to 3.9. The powders were then homogenized and tabletized.

After the tablets have been formed as shown in Step 12, the tablets are then melted as shown in Step 13 in a suitable manner, such as by use of an induction or electron beam furnace. During the melting step, the three powdered components are reacted to form a single oxide phase. The melt step can be used to form ingots, as shown in Step 14, of a suitable size such as a diameter of 5 cm and a length of 15–75 cm. The material can then be stored in this form until ready for use. Alternatively, the ingots can be crushed or broken up into granules of a size 0.5–5 mm and preferably about 2 mm as shown by Step 16 in FIG. 1. Also, if desired, the crushed material can be stored in this form until ready to be used.

Let it be assumed that it is desired to utilize the material in forming a layer of an anti-reflection coating such as that described in co-pending application Ser. No.08/438,197 filed May 9, 1995. In this embodiment the material had a crystal structure of the type cubic zirconia alone with no detectable crystal structure of the type $ZrTiO_4$. The crushed ingots in the form of granules were supplied as a feedstock to an electron gun evaporator of a conventional type to form the high index layer of an anti-reflection coating of the type described in co-pending application Ser. No. 08/438,197 filed May 9, 1995. During the evaporation of the material, an excess of oxygen was introduced into the vacuum chamber of the coating apparatus so that the sub-stoichiometric material was reactively evaporated with the oxygen to yield a stoichiometric coating.

It was found that the crushed ingot material, which is in the form of $ZrTiO_{2.8}$ melted at a temperature of approximately 1800° C., which is approximately 900° lower than the melting point of pure zirconium oxide. This lower melting and deposition temperature is very advantageous because much less heat is radiated from the source onto the substrate. For example, a source radiating at a temperature of 1800° C. emits less than one-fourth the total amount of energy as a 2700° C. source. The lower deposition temperatures of the material of the present invention permits coatings to be applied at higher rates and to thinner polymeric substrate materials, which is a definite advantage for obtaining high production, low cost yields of anti-reflection coatings utilizing roll coaters. In connection with this embodiment of the present invention, it has been found that the addition of the titanium oxide to the mixture results in the much lower melting temperatures as, for example, temperatures at least approximately 900° less than the melting temperature without the addition of the titanium oxide.

This material was found to have an index of refraction of approximately 2.0. When combined with a low index material such as described in co-pending application Ser. No. 08/438,197, filed May 9, 1995, it was found that the anti-reflection coatings formed were as hard and as adherent as films made from zirconium oxide as the high index material.

Another material formulated in accordance with the present invention is $NbTi_{0.5}O_3$, which can be generalized to $NbTi_{0.5}O_y$, where y can vary between a value greater than 0 and 3.5. The $NbTi_{0.5}O_3$ material was produced in a similar manner to the $ZrTiO_y$. Tablets were pressed from a homogeneous mixture of $Nb_2O_5$, Ti, and $TiO_2$ powders. These tablets were then melted into an ingot and crushed to provide feedstock for the electron gun evaporator. Although Nb/Ti ratios other than 2.0 can be used, $NbTi_{0.5}O_3$ was selected because it can be reactively evaporated with oxygen to yield the stoichiometric material $NbTi_{0.5}O_{3.5}$ ($Nb_2TiO_7$). This material had an index of refraction of approximately 2.0. Also, when utilized in making an anti-reflection coating, it had the desirable properties of a lower evaporation temperature, for example 1900° C. which is 200° C. below 2100° C. for $Nb_2O_5$.

From the foregoing it can be seen that there has been provided a new and improved class of mixed oxide high index optical coating materials and a method for applying the same which has many desirable features. Particularly, it lends itself to roll-coating operations because of its lower temperature required for evaporation of the material. It lends itself to electron gun evaporation because it is a single phase material and thus avoids fractionation. Also it provides a material which is hard and durable which particularly lends itself for use in anti-reflection coatings.

What is claimed is:

1. A composition of material of the formula $MN_xO_y$ where M is Nb and N is Ti and O is oxygen and x and y have values such that the oxygen-to-metal ratio is less than 4 and the ratio of $y/(1+x)$ is also less than 4, said material being in the form of a single oxide phase having a crystal structure of a single type alone without significant crystal structure of a second type, said material being sub-stoichiometric, said material having a crystal structure of the type of $NbO_2$ (niobium dioxide) alone with no significant crystal structure of the types $Nb_2O_5$ or $TiO_2$.

2. A material as in claim 1 wherein x=0.5 and y ranges from a value greater than 0 to 3.5.

3. A material as in claim 1 wherein said material has a formula of $NbTi_{0.5}O_{3.0}$.

* * * * *